United States Patent
Meisenburg et al.

(10) Patent No.: US 6,677,045 B1
(45) Date of Patent: Jan. 13, 2004

(54) MULTI-LAYER PAINTS AND METHOD FOR PRODUCING THE SAME

(75) Inventors: Uwe Meisenburg, Duisburg (DE); Karl-Heinz Joost, Troisdorf (DE); Andrea Hesselmaier, Drensteinfurt (DE); Heinz-Peter Rink, Münster (DE); Reinhold Schwaim, Wachenheim (DE); Erich Beck, Iadenbueg (DE); Rainer Königer, Freinsheim (DE)

(73) Assignee: BASF Coatings AG, Munster (DE)

( * ) Notice: Subject to any disclaimer, the term of this patent is extended or adjusted under 35 U.S.C. 154(b) by 0 days.

(21) Appl. No.: 09/485,982

(22) PCT Filed: Aug. 17, 1998

(86) PCT No.: PCT/EP98/05180
§ 371 (c)(1),
(2), (4) Date: Apr. 4, 2000

(87) PCT Pub. No.: WO99/08802
PCT Pub. Date: Feb. 25, 1999

(30) Foreign Application Priority Data

Aug. 20, 1997 (DE) .......................................... 197 36 083

(51) Int. Cl.$^7$ ............................................... B32B 27/16
(52) U.S. Cl. ............................... 428/424.2; 428/423.1; 428/480; 428/482; 428/483; 428/500; 428/502; 428/515; 428/520; 427/508
(58) Field of Search ............................ 428/423.1, 480, 428/482, 483, 500, 515, 521, 424.2, 502, 520; 427/508

(56) References Cited

U.S. PATENT DOCUMENTS

| | | | | |
|---|---|---|---|---|
| 4,052,280 A | * | 10/1977 | McGinnis | 522/33 |
| 4,351,708 A | * | 9/1982 | Berner et al. | 522/25 |
| 4,675,234 A | | 6/1987 | Sachs et al. | 428/328 |
| 4,844,947 A | * | 7/1989 | Kasner et al. | 427/510 |
| 5,486,384 A | * | 1/1996 | Bastian et al. | 427/493 |
| 5,674,569 A | * | 10/1997 | Ohsugi et al. | 427/407.1 |
| 6,231,984 B1 | * | 5/2001 | Horibe et al. | 428/416 |

FOREIGN PATENT DOCUMENTS

| | | | | |
|---|---|---|---|---|
| DE | 197 09 560 C1 | 7/1997 | ......... | C09D/201/02 |
| EP | 0 540 884 A1 | 3/1992 | ......... | B05D/3/06 |

OTHER PUBLICATIONS

Ways to Increase Adhesion of UV Coatings on Wood, Jan Weikard et al., 6 pages, no date given.
Novel Higher Molecular Weight HDDA Homologues for Rad-Cure Applications, by Matthias Fies et al., 6 pages, no date given.
Determination of the iodine number of vegetable oils and fats, by Christopher Jansen et al., www.fr-nir.com/Nutrition/iodzahl.htm, 3 pages, no date given.
Merriam-Webster Dictionary definition for the prefix "co" from www.m-w.com on Jan. 13, 2003.

* cited by examiner

Primary Examiner—James J. Seidleck
Assistant Examiner—Melanie Bissett

(57) ABSTRACT

The present invention relates to a multilayer coating comprising at least one basecoat layer and one topcoat layer, the coating being preparable by A. applying a component (I), if desired radiation-curable component, based on polyurethane resins, polyacrylate resins, polyester resins and/or amino resins and also mixtures thereof to a substrate and subjecting it to thermal partial crosslinking or drying at temperatures of less than 100° C., preferably 60–80° C., and B. applying a topcoat to this coating layer, and subsequently carrying out radiation curing.

16 Claims, No Drawings

MULTI-LAYER PAINTS AND METHOD FOR PRODUCING THE SAME

Subject-matter of the present invention are multilayer coating systems, their production, and the use.

PRIOR ART

In past years, great progress has been made in the development of acid- and etch-resistant clearcoats for automotive production-line (OEM) finishing. More recently there is now an increasing desire in the automotive industry for scratch-resistant clearcoats which at the same time retain the level achieved to date in their other properties too.

For instance, EP-A-540 884 discloses a process for producing multilayer coating systems, especially in the motor vehicle sector using free-radically and/or cationically polymerizable, silicone-containing clearcoats, the clearcoat being applied under illumination with light having a wavelength of more than 500 nm or in the absence of light, and the clearcoat layer subsequently being cured by means of high-energy rays. The surfaces obtained in this way are said to have good optical properties and a good scratch resistance.

Similarly, EP-A-568 967 discloses a process for producing multilayer coating systems, especially in the motor vehicle sector, using radiation-curable clearcoats.

DE 44 21 558, moreover, discloses a coating process in which a primer is partly crosslinked by means of radiation and then a radiation-curable coating material is applied. Subsequently, full crosslinking of the topcoat layer is carried out by means of electron beams. For additional and final curing of the coating material, furthermore, a concluding operation of heating the coating layer is recommended.

U.S. Pat. No. 4,675,234, finally, discloses a further multilayer coating system. In this case a basecoat is first of all applied to a substrate, and partly crosslinked by means of radiation, and a topcoat is applied to this partly crosslinked layer. This topcoat is subjected to radiation curing along with the basecoat layer.

The clearcoats employed to date do not adhere satisfactorily to the basecoats. In addition, the resistance of these multilayer systems to condensation is inadequate. Moreover, any reactive diluents present penetrate into the basecoat layer and so partly dissolve it. The consequence is an inadequately cured layer system.

SUBJECT OF THE INVENTION

The present invention is therefore based on the object of providing a multilayer coating comprising at least one basecoat layer and one topcoat layer and being free from the abovementioned disadvantages. The intention is, in particular, to achieve better adhesion of the base layer to the substrate and to the topcoat layer.

This object is achieved in that said coating can be produced by

A. applying a radiation-curable component (I) comprising binders based on polyurethane resins, polyacrylate resins, polyester resins and/or amino resins and also mixtures thereof to a substrate and subjecting it to thermal partial crosslinking or drying at temperatures of less than 100° C., preferably 60–80° C., and B. applying a topcoat to this coating layer, and subsequently carrying out radiation curing.

Basecoat

Preferably, aqueous basecoats are employed. In so far as solvents are present, their content is preferably below 15%. Further essential features are that the basecoat is both radiation-curable and at least partially thermally crosslinkable, or drying, at temperatures below 100° C. without irradiation.

Component (I)

Component I comprises binders which are at least partially crosslinking or drying at temperatures of below 100° C., preferably at temperatures of 60–80° C. In addition, the binders may be radiation-curable. The binders employed in accordance with the invention preferably have a double-bond density of 0.05–10, more preferably 0.1–4 and, with particular preference, 0.5–2 mol/kg.

The aromatics content lies preferably below 5%. The amine nitrogen content is preferably less than 2%, with particular preference below 1%.

It is likewise possible to employ non-radiation-curable binders comprising radiation-curable components having co-reactive groups, e.g. isocyanates, epoxides, melamines, malonic esters or anhydrides.

Radiation-curable oligomers may also be present in component I. In so far as the binders are not radiation-curable, such oligomers must be added.

In the basecoats of the invention the binders are employed preferably in an amount of from 5 to 90% by weight, with particular preference from 20 to 70% by weight, based in each case on the overall weight of the topcoat in the case of clearcoats or on the weight of the coating composition minus pigments and extenders in the case of pigmented systems.

As binders, use may be made of water-dilutable or water-dispersible polyurethane, polyacrylate, polyester and amino resins, and/or such resins which can be prepared in organic solution, and also mixtures thereof.

In the text below, the constituents of component I that can be employed in accordance with the invention are described in greater detail:

Polyurethanes

Suitable examples are the polyurethane resins described in the literature for use in water-based coating materials, especially if these polyurethane resins—in modification of the preparation described in the respective literature—can be prepared in the form of organic solutions.

Examples of suitable polyurethane resins are the resins described in the following documents: EP-A-355 433, DE-A 35 45 618, DE-A 38 13 866 and German Patent Application DE 4005961.8.

It is preferred to employ water-dilutable polyurethane resins which have a number-average molecular weight (determined by gel permeation chromatography using polystyrene as standard) of from 1000 to 30,000, preferably from 1500 to 20,000, and an acid number of from 5 to 70 mg of KOH/g, preferably from 10 to 30 mg of KOH/g, and which can be prepared by reaction, preferably chain extension, of isocyanate-functional prepolymers. Such polyurethane resins are described, for example, in European Patent Application 92904918.7, to which reference is made to that extent.

Carbamate-functional oligomers are among the preferred polyurethanes. The polyurethanes employed in accordance with the invention preferably have a double-bond density of 0.05–10 mol/kg, more preferably 0.1–4 mol/kg and, with particular preference, 0.5–2 mol/kg.

Polyacrylates

The polyacrylate resins employed as binders are likewise known and are described, for example, in DE-A 38 32 826. In general, suitable polyacrylate resins are those which are dilutable or dispersible in water and can be prepared in the form of organic solutions. They are preferably polyacrylates comprising radiation-curable components having co-reactive groups, e.g. isocyanates, epoxides, melamines, malonic esters or anhydrides.

Urethane Acrylates

Urethane(meth)acrylates are well known to the skilled worker and need not therefore be elucidated further.

The polyurethane acrylates which can be employed in accordance with the invention can be obtained by reacting a di- or polyisocyanate with a chain extender from the group of the diols/polyols and/or diamines/polyamines and/or dithiols/polythiols and/or alkanolamines and then reacting the remaining free isocyanate groups with at least one hydroxyalkyl(meth)acrylate or hydroxyalkyl ester of other ethylenically unsaturated carboxylic acids.

The amounts of chain extender, di- and/or polyisocyanate and hydroxyalkyl ester are in this case preferably chosen such that 1.) the ratio of equivalents of the NCO groups to the reactive groups of the chain extender (hydroxyl, amino and/or mercaptyl groups) lies between 3:1 and 1:2, and is preferably 2:1, and 2.) the OH groups of the hydroxyalkyl esters of the ethylenically unsaturated carboxylic acids are present in stoichiometric amount in relation to the remaining free isocyanate groups of the prepolymer formed from isocyanate and chain extender.

It is also possible to prepare the polyurethane acrylates by first reacting some of the isocyanate groups of a di- or polyisocyanate with at least one hydroxyalkyl ester and then reacting the remaining isocyanate groups with a chain extender. In this case too the amounts of chain extender, isocyanate and hydroxyalkyl ester are chosen such that the ratio of equivalents of the NCO groups to the reactive groups of the chain extender lies between 3:1 and 1:2, and is preferably 2:1, and the ratio of equivalents of the remaining NCO groups to the OH groups of the hydroxyalkyl ester is 1:1. All of the forms lying between these two processes are of course also possible. For example, some of the isocyanate groups of a diisocyanate can be reacted first of all with a diol, then a further portion of the isocyanate groups can be reacted with the hydroxyalkyl ester and, subsequently, the remaining isocyanate groups can be reacted with a diamine.

These various preparation processes for the polyurethane acrylates are known (cf. e.g. EP-A-204 161) and therefore do not require any more detailed description. Particular preference is given to aliphatic urethane(meth)acrylates and aliphatic(meth)acrylic esters. The urethane(meth)acrylates can be flexibilized by, for example, reacting corresponding isocyanate-functional prepolymers or oligomers with relatively long-chain, aliphatic diols and/or diamines, especially aliphatic diols and/or diamines having at least 6 carbon atoms. This flexibilization reaction can be carried out before or after the addition of acrylic and/or methacrylic acid onto the oligomers and/or prepolymers.

Further examples which may be mentioned of suitable binders are the following products which are obtainable commercially:

urethane acrylate Crodamer UVU 300 from Croda Resins Ltd., Kent, GB; aliphatic urethane triacrylate Genomer 4302 from Rahn Chemie, CH; aliphatic urethane diacrylate Ebecryl 284 from UCB, Drogenbos, Belgium; aliphatic urethane triacrylate Ebecryl 294 from UCB, Drogenbos, Belgium; aliphatic urethane triacrylate Roskydal LS 2989 from Bayer AG, Germany; aliphatic urethane diacrylate V94-504 from Bayer AG, Germany; aliphatic hexafunctional urethane acrylate Viaktin VTE 6160 from Vianova, Austria; aliphatic urethane diacrylate Laromer 8861 from BASF AG and experimental modifications thereof, such as urethane acrylate dispersion Laromer 8949 from BASF AG, and Viaktin 6155 from Vianova.

Polyesters

Polyester resins which are dilutable or dispersible in water and can be prepared in the form of organic solutions can also be used as binders. Use is made, for example, of corresponding commercial water-dilutable or water-dispersible polyester resins and also of the polyester resins which are customarily employed in water-based coating materials.

Amino Resins

Water-dilutable or water-dispersible amino resins are also suitable as binders. It is preferred to employ water-dilutable melamine resins. These are, generally, etherified melamine-formaldehyde condensation products. The water solubility of the amino resins depends—apart from on the degree of condensation, which should be as low as possible—on the etherifying component, with only the lowest members of the alcohol or ethylene glycol monoether series giving water-soluble condensates. Most important are the methanol-etherified melamine resins. With the use of solubilizers, butanol-etherified melamine resins can also be dispersed in aqueous phase. It is also possible to insert carboxyl groups into the condensate. Transetherification products of highly etherified formaldehyde condensates with oxycarboxylic acids are soluble in water after neutralization, by way of their carboxyl groups, and may be present in the base paints.

The binders employed may also of course comprise mixtures of the abovementioned binders and, in addition or alone, other water-dilutable or water-dispersible binders.

Radiation-curable Components

The basecoats of the invention may comprise radiation-curable oligomers, such as polyether, polyester and/or polyurethane(meth)acrylates and their dispersions. Preference is given to proportions of from 5 to 90% by weight, preferably, in UV-cured formulations, from 10 to 80% by weight, based on the weight of the coating composition minus pigments and extenders. Such oligomers must be added when the binders present in component I are not radiation-curable.

A binder system for component I that is preferred in accordance with the invention comprises preferably urethane(meth)acrylates. Particular preference is given to aliphatic urethane(meth)acrylates and aliphatic(meth)acrylic esters. Preferably, the double-bond density is 0.05–10, more preferably 0.1–4 and, with particular preference, 0.5–2 mol/kg.

A binder system which is preferred in accordance with the invention comprises aliphatic urethane dispersions and non-radiation-curable binders, preferably polyacrylates, comprising radiation-curable components having co-reactive groups, e.g. isocyanates, epoxides, melamines, malonic esters or anhydrides.

The aromatic content in this case lies preferably below 5%. The amine nitrogen content lies preferably below 2% and, with particular preference, below 1%.

Customary photoinitiators employed in radiation-curable systems, examples being benzophenones, benzoins or benzoin ethers, preferably hydroxyacrylic ketones and (bis)acylphosphine oxides, can likewise be used. it is also possible, for example, to employ the products obtainable commercially under the names Irgacure® 184, Irgacure® 1800 and Irgacure® 500 from Ciba Additive, Genocure® MBF from Rahn and Lucirin® TPO from BASF AG. When using cationic UV curing it is possible to employ epoxy systems, such as Cyracure 6110 (Union Carbide), and the corresponding photoinitiators, e.g. Cyracure 6990.

Further Additional Materials

Specifically, the basecoat may include, in addition, UV absorbers, preferably triazine compounds, and free-radical scavengers. It may also feature rheological agents and other coatings auxiliaries. Pigments of whatever kind may also of course be incorporated, examples being colour pigments such as azo pigments, phthalocyanine pigments, carbonyl pigments, dioxazine pigments, titanium dioxide, pigmentary carbon black, iron oxides and chromium and/or cobalt oxides, or special-effect pigments, such as metal flake pigments, especially aluminium flake pigments, and pearl lustre pigments, and/or liquid-crystalline polymers. The pigment content is 0.5.

The basecoats employed in accordance with the invention may also, if desired, include customary auxiliaries, additives, suitable light stabilizers (e.g. HALS compounds, benzotriazoles, oxalanilides, and the like), slip additives, polymerization inhibitors, matting agents, defoamers, levelling agents and film-forming auxiliaries, examples being cellulose derivatives, or other additives that are commonly employed in basecoats. These customary auxiliaries and/or additives are usually employed in an amount of up to 15% by weight, preferably from 2 to 9% by weight, based on the weight of the coating composition minus pigments and minus extenders.

Component (II)

Prior to application it is possible if desired to add a component (II) comprising crosslinking agents, preferably free isocyanates or a mixture of free polyisocyanates and, with utmost preference, polyisocyanates of low viscosity. Present as crosslinking agents there may therefore be at least one unblocked di- and/or polyisocyanate present if desired in dispersion or solution in one or more organic solvents which may or may not be dilutable with water.

The free polyisocyanate constituent comprises any desired organic polyisocyanates having free isocyanate groups attached to aliphatic, cycloaliphatic, araliphatic and/or aromatic structures. It is preferred to employ polyisocyanates having from 2 to 5 isocyanate groups per molecule and viscosities of from 100 to 2000 mPa.s (at 23 degrees C.). If desired, small amounts of organic solvent, preferably from 1 to 25% by weight based on pure polyisocyanate, can be added to the polyisocyanates in order to improve the ease of incorporation of the isocyanate and, if desired, to lower the viscosity of the polyisocyanate to a level which is within the abovementioned ranges. Examples of solvents suitable as additives for the polyisocyanates are ethoxyethyl propionate, butyl acetate and the like. Examples of suitable isocyanates are described, for example, in "Methoden der organischen Chemie" [Methods of Organic Chemistry], Houben-Weyl, Volume 14/2, 4th edition, Georg Thieme Verlag, Stuttgart 1963, page 61 to 70, and by W. Siefken, Liebigs Ann. Chem. 562, 75 to 136. Suitable, for example, are the isocyanates referred to in the description of the polyurethane resins (A2) and/or isocyanate-functional polyurethane prepolymers which can be prepared by reacting polyols with an excess of polyisocyanates and which are preferably of low viscosity. It is also possible to employ polyisocyanates which have isocyanurate and/or biuret and/or allophanate and/or urethane and/or urea and/or uretdione groups. Polyisocyanates having urethane groups, for example, are obtained by reacting some of the isocyanate groups with polyols, such as trimethylolpropane and glycerol, for example. It is preferred to employ aliphatic or cycloaliphatic polyisocyanates, especially hexamethylene diisocyanate, dimerized and trimerized hexamethylene diisocyanate, isophorone diisocyanate, 2-isocyanatopropylcyclohexyl isocyanate, dicyclohexylmethane 2,4'-diisocyanate or dicyclohexylmethane 4,4'-diisocyanate or mixtures of these polyisocyanates. Very particular preference is given to the use of mixtures of uretdione- and/or isocyanurate- and/or allophanate-functional polyisocyanates based on hexamethylene diisocyanate, as are formed by catalytic oligomerization of hexamethylene diisocyanate using appropriate catalysts. The polyisocyanate constituent may also consist, furthermore, of any desired mixtures of the free polyisocyanates given by way of example.

Crosslinking agents that are suitable in accordance with the invention, other than the abovementioned crosslinking agents, include tris(alkoxycarbonylamino)triazines of the formula

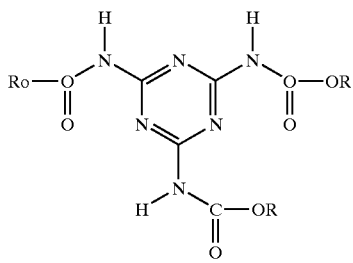

where R=methyl, butyl- . . . groups. It is also possible to employ derivatives of the said compounds. It is preferred to employ tris(alkoxycarbonylamino)triazines as are described in U.S. Pat. No. 5,084,541.

The carbamate groups react preferentially with OH carriers and, in particular, with hydroxyl groups having as little steric hindrance as possible. Amino groups cannot be crosslinked by the tris(alkoxycarbonylamino)triazine. Instead, there is elimination of the carbalkoxy group. For drying or partial crosslinking at temperatures of less than 100° C. it is preferable to add suitable catalysts.

Alternatively, in addition to the isocyanates described above, blocked isocyanate or a mixture of blocked polyisocyanates may be present in component (II). Compounds suitable for this purpose include those described above in connection with component (I).

A preferred embodiment of the invention is characterized in that the amounts of the crosslinking agents are 5–30 parts, preferably 20 parts, based on 100 parts of binder, solids/solids. In addition to the crosslinking agents mentioned, blocked crosslinking systems may also be present in component (I) and/or (II).

If blocked isocyanate is admixed, it is preferably designed so that it includes both isocyanate groups blocked with a blocking agent (Z1) and those blocked with a blocking agent (Z2), the blocking agent (Z1) being a dialkyl malonate or a mixture of dialkyl malonates, the blocking agent (Z2) being a blocking agent which is different from (Z1) and contains active methylene groups, or an oxime, or a mixture of these blocking agents, and the ratio of equivalents between the isocyanate groups blocked with (Z1) and the isocyanate groups blocked with (Z2) lies between 1.0:1.0 and 9.0:1.0, preferably between 8.0:2.0 and 6.0:4.0 and, with particular preference, between 7.5:2.5 and 6.5:3.5:. For drying or partial crosslinking at temperatures of 100° C., these blocked isocyanates are employed with the addition of appropriate catalysts.

The blocked isocyanate is prepared preferably as follows. A polyisocyanate or a mixture of polyisocyanates is reacted conventionally with a mixture of the blocking agents (Z1) and (Z2), the mixture of the blocking agents (Z1) and (Z2) comprising the blocking agents (Z1) and (Z2) in a molar ratio which lies between 1.0:1.0 and 9.0:1.0, preferably between 8.0:2.0 and 6.0:4.0 and, with particular preference, between 7.5:2.5 and 6.5:3.5. The polyisocyanate or the mixture of polyisocyanates can be reacted with the mixture of the blocking agents (Z1) and (Z2) to an extent such that isocyanate groups can no longer be detected. In practice, this may require the use of very large excesses of blocking agents and/or very long reaction times. It has been found that coating materials having good properties are obtained even when at least 50, preferably at least 70 percent of the isocyanate groups of the polyisocyanate or of the mixture of polyisocyanates are reacted with the mixture of the blocking agents (Z1) and (Z2) and the remaining isocyanate groups are reacted with a hydroxyl-containing compound or a mixture of hydroxyl-containing compounds. Hydroxyl-containing compounds employed are preferably low molecular mass aliphatic or cycloaliphatic polyols, such as neopentyl glycol, dimethylolcyclohexane, ethylene glycol, diethylene glycol, propylene glycol, 2-methyl-2-propylpropane-1,3-diol, 2-ethyl-2-butylpropane-1,3-diol, 2,2,4-trimethylpentane-1,5-diol and 2,2,5-trimethylhexane-1,6-diol, or the hydroxyl-containing binder which can be employed as constituent (1). A suitable blocked polyisocyanate is also obtainable by mixing polyisocyanates blocked with the blocking agent (Z1) and (Z2) in a ratio such that the mixture obtained features a ratio of equivalents between the isocyanate groups blocked with (Z1) and the isocyanate groups blocked with (Z2) of between 1.0:1.0 and 9.0:1.0, preferably between 8.0:2.0 and 6.0:4.0 and, with particular preference, between 7.5:2.5 and 6.5:3.5. In principle, all polyisocyanates which can be employed in the paints field can be employed for preparing the blocked polyisocyanate. It is preferred, however, to employ polyisocyanates whose isocyanate groups are attached to aliphatic or cycloaliphatic radicals. Examples of such polyisocyanates are hexamethylene diisocyanate, isophorone diisocyanate, trimethylhexamethylene diisocyanate, dicyclohexylmethane diisocyanate and 1,3-bis(2-isocyanatoprop-2-yl)benzene (TMXDI) and also adducts of these polyisocyanates with polyols, especially low molecular mass polyols, such as trimethylolpropane, for example, and isocyanurate- and/or biuret-functional polyisocyanates which can be derived from these polyisocyanates. Polyisocyanates employed with particular preference are hexamethylene diisocyanate and isophorone diisocyanate, isocyanurate- or biuret-functional polyisocyanates derived from these diisocyanates and containing preferably more than two isocyanate groups in the molecule, and also reaction products of hexamethylene diisocyanate and isophorone diisocyanate or of a mixture of hexamethylene diisocyanate and isophorone diisocyanate with 0.3–0.5 equivalents of a low molecular mass polyol having a molecular weight of from 62 to 500, preferably from 104 to 204, in particular a triol, such as trimethylolpropane, for example. Dialkyl malonates or a mixture of dialkyl malonates are employed as blocking agent (Z1). Examples of dialkyl malonates which can be employed are dialkyl malonates having in each case 1 to 6 carbon atoms in the alkyl radicals, such as dimethyl malonate and diethyl malonate, for example, preference being given to the employment of diethyl malonate. As blocking agents (Z2), blocking agents which are different from (Z1) and contain active methylene groups, and oximes, and also mixtures of these blocking agents, are employed. As examples of blocking agents which can be employed as blocking agents (Z2) mention is made of: methyl, ethyl, propyl, butyl, pentyl, hexyl, heptyl, octyl, nonyl, decyl or dodecyl acetoacetate, acetone oxime, methyl ethyl ketoxime, acetylacetone, formaldoxime, acetaldoxime, benzophenoxime, acetoxime and diisobutyl ketoxime. As blocking agent (Z2) it is preferred to employ an alkyl acetoacetate having 1 to 6 carbon atoms in the alkyl radical, or a mixture of such alkyl acetoacetates, or a ketoxime or mixture of ketoximes. Particular preference is given to ethyl acetoacetate or methyl ethyl ketoxime for use as blocking agent (Z2).

Preparation

The two components (I) and (II) are prepared by the customary methods from the individual constituents with stirring. The preparation of the basecoat from the individual components (I) and (II) takes place likewise by means of stirring or dispersion using commonly employed apparatus, for example by means of dissolvers or the like, or by means of the likewise customarily employed 2-component metering and mixing units, or by means of the process for preparing aqueous 2-component polyurethane coating materials that is described in DE-A-195 10 651, page 2, line 62, to page 4, line 5.

The components, especially component (I), can be formulated as nonaqueous components (i.e. with organic solvents) or as aqueous components. In the case of a nonaqueous formulation it is possible to use the organic solvents that are customary in paint preparation. Using aqueous components, aqueous coating compositions are obtained after components (I) and (II) have been mixed. If an aqueous coating composition is desired, the components (I) and/or (II) may alternatively be formulated in substantially water-free form and substantially free from organic solvents, and yet in water-dispersible form. In that case the aqueous coating composition is obtained by mixing the components and adding water. A component (I) soluble or dispersible in water can be formulated in a conventional manner by introducing, for example, acidic groups into the binder which are then neutralized with a customary base, such as ammonia or an organic amine such as triethylamine. The dissolving or dispersing of a water-dispersible component (I) and/or (II) in water takes place in a conventional manner by means, for example, of vigorous stirring with or without gentle heating. Alternatively, dissolving or dispersing may take place in water by means of nonionic emulsifiers. To this extent, reference is again made to standard techniques for preparing aqueous coating materials.

Use

The basecoats of the invention are suitable for the direct coating of a substrate. In this case, if desired, component (I) and (II) are mixed with one another to form the coating composition prior to application, preferably directly before application, this coating composition is applied, and the applied composition is dried for 5–30 minutes, preferably 10 minutes, at less than 100° C., preferably 60–80° C. Component (I) and component (II) can if desired be applied by means of a special two-component applicator, then dried and cured together.

The aqueous coating materials prepared using the component system of the invention can be applied to glass and to a very wide variety of metal substrates, such as aluminium, steel, various alloys of iron, and the like. It is likewise possible to coat primed or unprimed plastics such as ABS, AMMA, ASA, CA, CAB, EP, UF, CF, MF, MPF, PF, PAN, PA, PC, PE, HDPE, LDPE, LLDPE, UHMWPE, PET, PMMA, PP, PS, SB, PUR, PVC, RF, SAN, PBT, PPE, POM, PUR-RIM, SMC, BMC, PP-EPDM and UP (abbreviations according to DIN 7728T1), for example.

The plastics to be coated can of course also be polymer blends, modified plastics or fibre-reinforced plastics. Preferably, the coating compositions of the invention are used to coat polycarbonate blends and polypropylene blends, for example. The coating compositions of the invention are employed in particular for the plastics that are commonly employed in vehicle construction, especially motor vehicle construction.

In the case of unfunctionalized and/or apolar substrate surfaces, these substrates should be subjected to pretreatment, such as by plasma or flaming, prior to coating.

Suitable primers in this context are all customary primers, including both conventional and aqueous primers. It is of course also possible to employ radiation-curable conventional and radiation-curable aqueous primers.

Finally, the coating compositions may be applied to other substrates as well, such as metal, wood or paper, for example. Application takes place with the aid of customary methods, for example by spraying, casting, knifecoating, dipping or brushing.

According to the specified uses of the component system, according to the invention, the invention also embraces binders and coating materials prepared with this system and also articles coated with these binders and coating materials.

The coating compositions of the invention are dried normally at temperatures of less than 100° C. preferably at temperatures of 60–80° C. Curing of the basecoat is carried out subsequently with radiation, preferably UV light or electron beams. If desired, radiation curing may be carried out only after a topcoat layer has been applied.

The basecoat described is notable for surprisingly improved properties and, in particular, by better adhesion of the coating layer to the coated substrates. Similarly, the adhesion of coating layers applied to the basecoat layer is better. In so far as reactive diluents are present in the next coating layer, they are surprisingly unable to start dissolving the basecoat. In addition, when coated with a topcoat, the basecoat exhibits enhanced condensation resistance. The swelling of the base layer is also reduced. In addition, the brightness of colour and the colour effects are improved.

Topcoat

In accordance with the invention, a radiation-curable topcoat layer is applied to the basecoat layer. This topcoat layer is preferably a clearcoat. A composition which can be employed with preference for this topcoat layer is elucidated further below.

The solids content of the topcoat is . . . , . . . It is preferred to employ water-dilutable binders. In so far as solvents are present, their content is below 15%.

It is selected such that the cured topcoat has a storage modulus E' in the elastomeric range of at least $10^{7.6}$ Pa, preferably of at least $10^{8.0}$ Pa and, with particular preference, of at least $10^{8.3}$ Pa, and a loss factor at 20° C. of not more than 0.10, preferably not more than 0.06, the storage modulus E' and the loss factor tan δ having been measured by dynamomechanical thermoanalysis on homogeneous free films having a thickness of 40±10 μm. The loss factor tan δ is defined here as the quotient of the loss modulus E" and the storage modulus E'.

Dynamomechanical thermoanalysis is a widely known method of determining the viscoelastic properties of coatings and is described, for example, in Murayama, T., Dynamic Mechanical Analysis of Polymeric Material, Elsevier, New York, 1978 and Loren W. Hill, Journal of Coatings Technology, Vol. 64, No. 808, May 1992, pages 31 to 33.

The measurements can be made using, for example, the instruments MK II, MK III or MK IV from Rheometrics Scientific.

The radiation-curable topcoat described, having the corresponding viscoelastic properties referred to above, are preferably curable by means of UV or electronic radiation, especially by means of UV radiation. In addition, topcoats based on ormocers, inter alia, are also suitable, for example.

These radiation-curable topcoats normally include at least one and preferably two or more radiation-curable binders based in particular on ethylenically unsaturated prepolymers and/or ethylenically unsaturated oligomers, alone or together with one or more reactive diluents, with or without one or more photoinitiators and with or without customary auxiliaries and additives.

It is preferred to employ radiation-curable coating compositions whose viscosity at 23° C. is less than 100 s flow time in the DIN 4 cup, with particular preference less than 80 s flow time in the DIN 4 cup.

Binders

Examples of binders employed in these radiation-curable coating compositions are (meth)acrylofunctional (meth) acrylic copolymers, polyether acrylates, polyester acrylates, unsaturated polyesters, epoxy acrylates, urethane acrylates, amino acrylates, melamine acrylates, silicone acrylates and the corresponding methacrylates. It is preferred to employ binders which are free from aromatic structural units. The use of epoxy acrylates leads to coatings which, although hard and scratch resistant, generally exhibit a level of weathering stability that is in need of improvement. Preference, therefore, is given to employing urethane(meth) acrylates and/or polyester(meth)acrylates, the use of aliphatic urethane acrylates being particularly preferred. Preference is also given to the use of substantially silicone-free and, with particular preference, silicone-free binders, since the resulting topcoats then possess an overcoatability which is improved relative to that of silicone-containing topcoats, especially on refinish.

The polymers or oligomers employed as binders normally have a number-average molecular weight of from 500 to 50,000, preferably from 1000 to 5000.

The polymers and/or oligomers employed in the topcoats of the invention preferably have at least 2 and, with particular preference, from 3 to 6 double bonds per molecule. The binders used preferably also have a double bond equivalent weight from 400 to 2000, with particular preference from 500 to 900. In addition, the binders have a viscosity at 23° C. which is preferably from 250 to 11,000 mPa.s.

Polyester Acrylates

Polyester(meth)acrylates are known in principle to the skilled worker. They can be prepared by various methods. For example, acrylic acid and/or methacrylic acid can be employed directly as acid component when synthesizing the polyesters. In addition there exists the possibility of employing hydroxyalkyl esters of (meth)acrylic acid as alcohol component directly when synthesizing the polyesters. Preferably, however, the polyester(meth)acrylates are prepared by acrylicization of polyesters. For example, it is possible first of all to synthesize hydroxyl-containing polyesters, which are then reacted with acrylic or methacrylic acid. It is also possible first of all to synthesize carboxyl-containing polyesters, which are then reacted with a hydroxyalkyl ester of acrylic or methacrylic acid. Unreacted (meth)acrylic acid can be removed from the reaction mixture by washing, distillation or, preferably, by reaction with an equivalent amount of a mono- or diepoxide compound using appropriate catalysts, such as triphenylphosphine, for example. For further details of the preparation of polyester acrylates reference may be made in particular to DE-A 33 16 593 and DE-A 38 36 370 and also to EP-A-54 105, DE-B 20 03 579 and EP-B-2866.

Polyether Acrylates

Polyether(meth)acrylates are likewise known in principle to the skilled worker. They can be prepared by various methods. For example, hydroxyl-containing polyethers which are esterified by acrylic acid and/or methacrylic acid can be obtained by reacting dihydric and/or polyhydric alcohols with various amounts of ethylene oxide and/or propylene oxide by well-known methods (cf. e.g. Houben-Weyl, Volume XIV, 2, Makromolekulare Stoffe [Macromolecular substances] II, (1963)). It is also possible to employ products of the addition polymerization of tetrahydrofuran or of butylene oxide.

The polyether(meth)acrylates and the polyester(meth)acrylates can be flexibilized, for example, by reacting corresponding OH-functional prepolymers or oligomers (based on polyether or polyester) with relatively long-chain aliphatic dicarboxylic acids, especially aliphatic dicarboxylic acids having at least 6 carbon atoms, examples being adipic, sebacic, dodecanedioic and/or dimeric fatty acids. This flexibilization reaction can be carried out before or after the addition of acrylic and/or methacrylic acid onto the oligomers and/or prepolymers.

Epoxy Acrylates

Epoxy(meth)acrylates are also well known to the skilled worker and therefore require no further elucidation. They are normally prepared by addition reaction of acrylic acid with epoxy resins, examples being epoxy resins based on bisphenol A, or other commercially customary epoxy resins.

The epoxy(meth)acrylates can be flexibilized analogously by, for example, reacting corresponding epoxy-functional prepolymers and/or oligomers with relatively long-chain, aliphatic dicarboxylic acids, especially aliphatic dicarboxylic acids having at least 6 carbon atoms, examples being adipic, sebacic, dodecanedioic and/or dimeric fatty acids. This flexibilization reaction can be carried out before or after the addition of acrylic and/or methacrylic acid onto the oligomers and/or prepolymers.

It is possible, furthermore, to employ the urethane acrylates, described above and used in the basecoats, for topcoats as well.

Reactive Diluents

The topcoats of the invention may, it desired, include one or more reactive diluents. These reactive diluents can be ethylenically unsaturated compounds. The reactive dilients can be mono-, di- or polyunsaturated. They serve customarily to influence the viscosity and the technical properties of the coating material, such as the crosslinking density, for example.

The reactive diluent or diluents are employed in the topcoats of the invention preferably in an amount of from 0 to 70% by weight and, with particular preference, from 15 to 65% by weight, based in each case on the overall weight of the topcoat in the case of the clearcoats or on the weight of the topcoat minus pigments and extenders in the case of pigmented systems.

Examples of reactive diluents employed are (meth)acrylic acid and esters thereof, maleic acid and its esters and/or monoesters, vinyl acetate, vinyl ethers, vinylureas and the like. Examples are alkylene glycol di(meth)acrylate, polyethylene glycol di(meth)acrylate, 1,3-butanediol di(meth) acrylate, vinyl(meth)acrylate, allyl(meth)acrylate, glycerol tri(meth)acrylate, trimethylolpropane tri(meth)acrylate, trimethylolpropane di(meth)acrylate, styrene, vinyltoluene, divinylbenzene, pentaerythritol tri(meth)acrylate, pentaerythritol tetra(meth)acrylate, dipropylene glycol di(meth) acrylate, tripropylene glycol di(meth)acrylate, hexanediol di(meth)acrylate, ethoxyethoxyethyl acrylate, N-vinylpyrrolidone, phenoxyethyl acrylate, dimethylaminoethyl acrylate, hydroxyethyl(meth)acrylate, butoxyethyl acrylate, isobornyl(meth)acrylate, dimethylacrylamide and dicyclopentyl acrylate, and the long-chain linear diacrylates described in EP-A-250 631, having a molecular weight of 400 to 4000, preferably 600 to 2500. The two acrylate groups can, for example, be separated by a polyoxybutylene structure. It is also possible to employ decyl 1,10-diacrylate and dodecyl 1,12-diacrylate, and the reaction product of 2 moles of acrylic acid with one mole of a dimeric fatty alcohol having generally 36 carbon atoms. Mixtures of the abovementioned monomers are also suitable.

Preferred reactive diluents are mono- and/or diacrylates, such as isobornyl acrylate, hexanediol diacrylate, tripropylene glycol diacrylate, Laromer® 8887 from BASF AG and Actilane® 423 from Akcros Chemicals Ltd., GB. It is particularly preferred to employ isobornyl acrylate, hexanediol diacrylate and tripropylene glycol diacrylate.

Radiation-curable Components

The topcoats of the invention comprise—preferably in proportions of from 0 to 10% by weight, in UV-cured formulations preferably from 2 to 60% by weight, based on the weight of the coating composition minus pigments and extenders—customary photoinitiators employed in radiation-curable coating compositions, examples being benzophenones, benzoins or benzoin ethers, preferably hydroxyacrylic ketones and bis(acyl)phosphine oxides in UV formulations. It is also possible, for example, to employ the products obtainable commercially under the names Irgacure® 184, Irgacure® 1800 and Irgacure® 500 from Ciba Geigy, Genocure® MBF from Rahn and Lucirin® TPO from BASF AG.

Further, Additional Substances

The topcoats of the invention may if desired also include customary auxiliaries and/or additives, examples being light stabilizers (e.g. HALS compounds, benzotriazoles, oxalanilide, and the like), slip additives, polymerization inhibitors, matting agents, defoamers, levelling agents and film-forming auxiliaries, examples being cellulose derivatives, or other additives that are commonly employed in topcoats. These customary additives and/or auxiliaries are usually employed in an amount of up to 15% by weight, preferably from 2 to 9% by weight, based on the weight of the topcoat minus pigments and minus extenders.

Use

The topcoats of the invention are employed in particular as clearcoats, so that they normally contain only transparent extenders, if any at all, and contain no hiding pigments. Use in the form of pigmented topcoats, however, is also possible. In this case the topcoats contain from 2 to 40% by weight, based on the overall weight of the topcoat, of one or more pigments. Also, in this case the topcoats may include from 1 to 20% by weight, based on the overall weight of the topcoat, of one or more extenders.

In order to prepare coatings, the topcoats of the invention are applied to substrates coated with basecoat according to the invention, examples of such substrates being metal panels or metal strips and plastics of whatever kind.

The layer thicknesses of the basecoat are, in accordance with the invention, between 5 and 100 $\mu$m, preferably from 10 to 50 $\mu$m and, with particular preference, from 15 to 30 $\mu$m.

The present invention therefore also provides a process for producing multilayer coating systems, in which process A. a component (I) comprising binders, which may or may not be radiation-curable and which are based on polyurethane resins, polyacrylate resins and amino resins and also mixtures thereof and preferably, if the binder is not radiation-curable, a radiation-curable component, preferably a radiation-curable oligomer, is mixed if desired with a component (II) comprising free polyisocyanate, the mixture is applied to a substrate and the applied layer is subjected if desired to radiation curing at temperatures of less than 100° C., preferably 60–80° C., and B. to this coating layer there is applied a topcoat, which is subjected to radiation curing.

The coating films are cured by means of radiation, preferably by means of UV radiation. The apparatus and conditions for these curing methods are known from the literature (cf. e.g. R. Holmes, U.V. and E.B. Curing Formulations for Printing Inks, Coatings and Paints, SITA Technology, Academic Press, London, United Kingdom 1984) and require no further description.

In so far as radiation curing of the basecoat layer has not been carried out prior to applying the topcoat layer, it can then take place in one step together with the curing of the topcoat layer.

The multilayer coatings of the invention are preferably employed as coatings in the field of automotive finishing (automotive OEM finishing and refinishing). In addition to their application to a very wide variety of metals, the coating compositions can of course also be applied to other substrates, such as wood, paper, plastics, mineral substrates or the like, for example. They are, furthermore, susceptible of employment in the field of the coating of packaging containers as well, and in the field of the coating of films for the furniture industry, vehicle components and the like.

The multilayer coating systems of the invention are particularly suitable for use in the field of the motor-vehicle OEM finishing and/or motor-vehicle refinishing of car bodies and parts thereof and also lorry bodies and the like.

The invention is elucidated further below with reference to exemplary embodiments. In these embodiments, all parts are by weight unless expressly stated otherwise.

Red Variations for UV Clearcoat Applications
- a) Imperial Red—Standard (obtainable from BASF Coatings AG in Münster, polyurethane dispersion which crosslinks on temperature exposure with melamine condensate resins)
- b) Imperial Red—Standard+7.5% isocyanate based on overall weight (Basonat HI 100, obtainable from BASF Coatings AG in Münster, 100% solids content, NCO content 22.5% HDI trimer)
- a)+b) dried initially at 80° C. for 10 minutes
- c) as a), but polyurethane resin substituted 1:1 for 30% by weight (based on overall coating material) radiation-curable urethane acrylate dispersion (Laromer 8949, obtainable from BASF AG, polyurethane dispersion with free acrylate groups) , UV initiator (Irgacure® 184+Lucirin LR 8893)+7.5% isocyanate based on overall weight (Basonat HI 100, obtainable from BASF AG, 100% solids content NCO content 22.5% HDI trimer)
- d) as c), but without isocyanate
- c)+d) dried initially at 80° C. for 10 minutes+UV curing at 1500 mJ/cm$^2$ UV and clearcoat is employed in all examples:
=>Laromer 8861 (BASF AG, urethane diacrylate 80% in hexanediol diacrylate) reactive diluent, light stabilizer additives (Tinuvin 400, Tinuvin 292 from Ciba), photoinitiator (Irgacure® 164 from Ciba)
=>UV curing Result
- a) before clearcoat application: soft, not scratch-proof after clearcoat application: visually satisfactory, but very soft, crosshatch satisfactory after constant alternating climate test (40° C., 100% atmospheric humidity): mate cracking, crosshatch unsatisfactory
- b) before clearcoat application: scratchproof only after 2 days after clearcoat application: slight texture, fully cured, crosshatch satisfactory after alternating climate test: texture, softening, crosshatch unsatisfactory
- c) before clearcoat application: scratchproof after clearcoat application: visually satisfactory, crosshatch satisfactory after alternating climate test: crosshatch satisfactory
- d) before clearcoat application: soft after clearcoat application: visually satisfactory, very soft after alternating climate test: full subfilm creep with H$_2$O

SUMMARY

The batches with isocyanate exhibit a markedly better resistance to condensation.

| Formulation: | |
|---|---|
| Paste mixture | 21.0 |
| Butyl glycol | 13.0 |
| Levelling agent | 1.0 |
| Deionized water | 4.0 |
| Polyurethane acrylate | 57.5 |
| Irgacure 184 | 3.0 |
| Photoinitiator | 5.0 |
| Deionized water (polyisocyanate crosslinker) | 10.0 |

What is claimed is:

1. Multilayer coating comprising at least one basecoat layer and one topcoat layer prepared by
    A. applying a basecoat to a substrate and subjecting the basecoat to thermal partial crosslinking or drying at temperatures of less than 100° C., and
    B. applying a topcoat to the basecoat, and subsequently carrying out radiation curing; wherein the basecoat comprises a radiation-curable component (I) comprising a first binder that is at least one of:
        i) a radiation-curable resin that is at least one of a polyurethane resin, a polyacrylate resin, a polyester resin, and an amino resin, and
        ii) a radiation-curable oligomer, and
        a second binder that is different from the first binder comprising a radiation-curable component having co-reactive groups thereon that are at least one of an isocyanate, a melamine, a malonic ester, and an anhydride.

2. A multilayer coaling according to claim 1, wherein the first binder comprises the radiation-curable oligomer.

3. A multilayer coating according to claim 1, wherein the first binder comprises the radiation-curable resin.

4. A multilayer coating according to claim 1, wherein the double-bond density of at least one of the first binder and the second binder is 0.05–10 mol/kg.

5. A multilayer coating according to claim 1, wherein the second binder is a polyacrylate that has the radiation curable co-reactive groups thereon.

6. A multilayer coating according to claim 1, wherein the co-reactive groups further comprise an epoxide.

7. A multilayer coating according to claim 1, wherein the basecoat further comprises free polyisocyanate.

8. A multilayer coating according to claim 1, wherein the basecoat comprises water-dilutable binders.

9. A multilayer coating according to claim 1, wherein the solvent content lies below 3.5%.

10. A multilayer coating according to claim 1, wherein the basecoat and the topcoat are curable by means of UV radiation or electron beam radiation.

11. A multilayer coating according to claim 1, wherein the double-bond density of at least one of the first binder and the second binder is 0.1–4 mol/kg.

12. A multilayer coating according to claim 1, wherein the basecoat further comprises component II, a crosslinking agent.

13. A multilayer coating according to claim 12 wherein the crosslinking agent is an unblocked di- or polyisocyanate.

14. A multilayer coating according to claim 12 further comprising blocked di- or polyisocyante compounds.

15. A process for producing a coated substrate with the multilayer coating of claim 1 comprising
   (a) applying to a substrate the basecoat composition,
   (b) subjecting said basecoat to thermal partial crosslinking or drying at temperatures of from 60–80° C.,
   (c) subsequently applying to the basecoat, a topcoat and
   (d) subsequently curing the coating layers with radiation.

16. A coated substrate, comprising a motor vehicle or motor vehicle component having thereon a multilayer coating of claim 2.

* * * * *